United States Patent
Nakamura (10) Patent No.: US 7,380,718 B2
(45) Date of Patent: Jun. 3, 2008

(54) METHOD FOR READING OUT SYMBOL INFORMATION AND DEVICE FOR READING OUT SYMBOL INFORMATION

(75) Inventor: Hiroshi Nakamura, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 11/316,546

(22) Filed: Dec. 21, 2005

(65) Prior Publication Data

US 2006/0175414 A1    Aug. 10, 2006

(30) Foreign Application Priority Data

Dec. 21, 2004  (JP)  ............... 2004-369609
Sep. 30, 2005  (JP)  ............... 2005-289412

(51) Int. Cl.
*G06K 7/10*  (2006.01)

(52) U.S. Cl. .................. 235/462.01; 235/462.07; 235/462.25

(58) Field of Classification Search ........... 235/462.01, 235/462.12, 462.16–462.19, 462.25, 494, 235/462.07–462.11; 382/245, 289
See application file for complete search history.

(56) References Cited

U.S. PATENT DOCUMENTS 5,635,697 A * 6/1997 Shellhammer et al. . 235/462.11
6,267,293 B1 * 7/2001 Dwinell et al. ........ 235/462.12
6,405,925 B2 * 6/2002 He et al. ................ 235/462.25
6,651,893 B2 * 11/2003 He et al. .................... 235/494
7,065,261 B1 * 6/2006 Horie .......................... 382/289

FOREIGN PATENT DOCUMENTS

JP   2-268383   11/1990
JP   5-324887   12/1993
JP   9-50480    2/1997

OTHER PUBLICATIONS

Hu Donghong et al., "Algorithm for Detecting the Rows Boundary of the PDF417 Barcode," Nov. 3, 2005, Proc. of SPIE vol. 6043, pp. 60431Z-1 to 60431Z-12.*

* cited by examiner

*Primary Examiner*—Daniel Stcyr
(74) *Attorney, Agent, or Firm*—Cantor Colburn LLP (57) ABSTRACT

To provide a method for reading out symbol information and a device for reading out symbol information which are able to prevent a decline in decoding reliability by reducing noise caused by a quantized error, localized contaminations or the like. The method for reading out symbol information may comprise a process in which the image data, obtained by imaging the symbol information such as bar codes and the like, are converted to corrected image data having zero angle of inclination; a smoothing process in which the corrected image data are smoothed; and a column specifying process in which breakpoints of said symbol information column are specified by computing the total sum in the row direction on the smoothed corrected image data.

10 Claims, 9 Drawing Sheets

| LINE GROUPS | LINE-MAKE UP | JUDGMENT VALUES |
|---|---|---|
| S1 | L1,L2,,L3 | 1 |
| .... | .... | ... |
| S15 | L15,L16,L17 | 1 |
| S16 | L16,L17,L18 | 0 |
| S17 | L17,L18,L19 | 0 |
| S18 | L18,L19,L20 | 0 |
| S19 | L19,L20,L21 | 1 |
| .... | .... | ... |
| S21 | L21,L22,L23 | 1 |
| .... | .... | ... |
| Sn-2 | Ln-2,Ln-1,Ln | 1 |

METHOD FOR READING OUT SYMBOL INFORMATION AND DEVICE FOR READING OUT SYMBOL INFORMATION

CROSS REFERENCE TO RELATED APPLICATION

The present invention claims priority under 35 U.S.C. §119 to Japanese Application No. 2004-369609 filed Dec. 21, 2004 and to Japanese Application No. 2005-289412 filed on Sep. 30, 2005, both of which are incorporated herein by reference.

FIELD OF INVENTION

The present invention may relate to a method for reading out symbol information and a device for reading out symbol information which optically reads out symbol information such as bar codes and the like. In particular, it may relate to a method for reading out symbol information and a device for reading out symbol information which is able to read out symbol information after suppressing the influence of noise.

BACKGROUND

Bar codes have hitherto been widely used as a means to impart unique information to a medium such as plastics, paper or the like for its autorecognition. For example, one dimensional bar codes are widely used for general consumer goods for the purpose of the POS management system, inventory management or the like. Furthermore, as the applications of bar codes are expanded, the demands on the information volume of bar codes increase, and the symbol information referred to as two dimensional bar codes, which have a significantly greater capacity than one dimensional bar codes, are making their appearance. And readout devices to deal with the two dimensional codes are also gradually being used widely.

Among these two dimensional bar codes, one form is to increase the information volume by piling up the one dimensional codes; this is called stack-type bar codes. For a representative one, there is a code system stack-type bar code referred to as PDF 417. Moreover, this code system PDF 417 is an international standard.

For the readout device to read out stack-type bar codes, there is a readout device described in Japanese Kokai Patent Application No. H2-268383 or Japanese Kokai Patent Application No. H5-324887 (Paragraph [0013]). The bar code reader disclosed in Japanese Kokai Patent Application No. H2-268383 images bar codes with a two dimensional imaging device, integrates the image into memory, and decodes the bar code symbol information based on the above data.

However, the bar code reader disclosed in Japanese Kokai Patent Application No. H2-268383 has a problem that readout precision becomes dependent on the direction of the label of stack-type bar codes, and also a problem that it does not take into consideration a situation in which the label is imaged outside the view of the imaging device. The symbol information readout device disclosed in Japanese Kokai Patent Application No. H5-324887 (Paragraph [0013]) solves such problems. In the symbol information readout device disclosed in Japanese Kokai Patent Application No. H5-324887 (Paragraph [0013]), bar codes are imaged with the two dimensional imaging device, and the bar code position and inclination are detected. As a result, whatever direction the label of stack-type bar codes is set to, or even if the image has defects, the symbol information readout device is arranged so as to be able to read out the bar code symbol information.

Moreover, Japanese Kokai Patent H9-050480 discloses a symbol information readout device which used is a line sensor that reads out without correcting the inclination to rearrange a recording medium when the symbol of two dimensional bar codes is placed.

SUMMARY

Nevertheless, the bar code reader disclosed in Japanese Kokai Patent Application No. H2-268383 has a problem that readout precision depends on the direction of the label of stack-type bar codes, and also a problem that a situation in which the label is imaged outside the view of the imaging device is not taken into consideration. The symbol information readout device disclosed in Japanese Kokai Patent Application No. H5-324887 (Paragraph [0013]) solves such problems. In the symbol information readout device disclosed in Japanese Kokai Patent Application No. H5-324887 (Paragraph [0013]), bar codes are imaged with the two dimensional imaging device, and the bar code position and inclination are detected. As a result, whatever the direction the label of stack-type bar codes is set to, or even if the image has defects, the symbol information readout device is arranged so as to be able to read out the bar code symbol information.

Additionally, the symbol information readout device disclosed in Japanese Kokai Patent Application No. H5-324887 (Paragraph [0013]) has a problem that reliability of decoding declines when the inclination of the label of stack-type bar codes is not zero.

That is to say, in the symbol information readout device disclosed in Japanese Kokai Patent Application No. H5-324887 (Paragraph [0013]), after the inclination of the label of the stack-type bar code is obtained, a straight line that becomes the reference of cutting is obtained, a scan line is determined based on it, the address at the point on this scan line is calculated, and the picture element value of the corresponding point is acquired and stored in a picture element value array.

Therefore, particularly when the inclination of the label of the stack-type bar code is not zero (when the label inclination does not become horizontal or vertical), there is a problem that a quantized error that occurs at the time of address calculation causes the generation of noise in the picture element array obtained, entailing a decline in reliability of decoding.

Furthermore, the symbol information readout device disclosed in Japanese Kokai Patent Application No. H5-324887 (Paragraph [0013]) has a problem that, since a picture element array is basically obtained by thinning scanning, the device is not only vulnerable to localized noise but also lacks reliability in the point that only part of the symbol image information can be used for decoding.

Moreover, the symbol information readout device disclosed in Japanese Kokai Patent H9-050480 has a problem that, when a bar code-recorded medium is scanned with the one dimensional image element to integrate the bar code image, if the scanning rate varies the bar width varies making an accurate readout impossible.

In full response to the above points, the present invention is made. Its objective is to provide a method for reading out symbol information and a device for reading out symbol information which are not only able to prevent a decline in decoding reliability by reducing noise caused by a quantized error, localized contaminations or the like but are also able to perform an accurate readout without varying the bar width even if the scanning rate vanes.

In addition, its objective is also to provide a symbol information readout device with a simple configuration which acquires the bar code image by scanning a bar code-recorded medium with a stack-type one dimensional imaging device without using a complex optical system.

In order to solve the above problems, an embodiment of the present invention, namely the symbol information readout method, may comprise a process in which the image data, obtained by imaging the symbol information such as bar codes and the like, are converted to corrected image data having zero angle of inclination; a smoothing process in which the corrected image data are smoothed; and a column specifying process in which breakpoints of said symbol information column are specified by computing the total sum in the row direction on the smoothed corrected image data.

More specifically, the present invention may provide the following.

A method for reading out symbol information in which symbol information is read by processing the image data obtained by imaging the symbol information recorded on a medium may comprise an angle changing process in which the image data are converted to corrected image data having zero angle of inclination; a smoothing process in which the corrected image data are smoothed; and a column specifying process in which breakpoints of the symbol information column are specified by computing the total sum in the row direction on the corrected image data smoothed by the smoothing process.

According to an embodiment of the present invention, the image data obtained by capturing the symbol information recorded on a medium made of paper, plastic, and the like is processed by software. As a result, the method for reading out symbol information in which the symbol information is read out comprises an angle changing process in which the image data are converted to corrected image data having zero angle of inclination; a smoothing process in which the corrected image data are smoothed; and a column specifying process in which breakpoints of the symbol information column are specified by computing the total sum in the row direction on the corrected image data smoothed by the smoothing process. The column specifying process is carried out after the corrected image data given zero angle of inclination by the angle changing process is smoothed.

Thus, noise generated by a quantized error or localized contamination and the like can be reduced, and a decline in reliability of decoding can be prevented as well. Moreover, calculation of the profile obtained by counting picture elements for every symbol information line can specify the column boundary, thus suppressing the influence of noise caused by localized contaminations or the like by the projection equalization effect.

Here, any technique can be used for the "angle changing process" as long as the corrected image data having zero angle of inclination can be produced as a result of not to mention changing the inclination of the image data itself obtained by imaging symbol information to convert the image data to the corrected image data having zero angle of inclination, and rotating the optical coordinate system to convert the image data into the corrected image data having substantially zero angle of inclination.

Moreover, any technique can be used for the "smoothing process" as long as it is an interpolation processing or equalization process whose objective is smoothing. The corrected image data are filtered with any filter among many such as a median filter, an edge preserving filter, an adaptation Winner filter, a smoothing filter, and the like so as to interpolate or equalize the corrected image.

Moreover, a method for reading out symbol information is described in claim 1 may utilize the fact that the symbol information readout method further comprises a line specifying process in which breakpoints of symbol information lines are specified by setting a group made up with continuous multiple lines on the corrected image data smoothed by the smoothing process, and by computing correlation value rows on the lines for which a group is set as the group is moved relative to the corrected image data.

Also according to an embodiment of the present invention, the symbol information readout method mentioned above may comprise a line specifying process in which breakpoints of symbol information lines are specified by setting a group made up with continuous multiple lines (e.g. line 1, line 2, line 3) on the corrected image data smoothed by the smoothing process, and by computing correlation value rows on the lines for which a group is set as the group is moved (e.g. line 2, line 3, line 4, followed by line 3, line 4, line 5) relative to the corrected image data. As a result, noise caused by a quantized error or localized contamination and the like can be suppressed before breakpoints of symbol information lines are specified. Finally, a decline in decoding reliability can be prevented.

The symbol information readout method as described in claim 1 or claim 2 may utilize the fact that the symbol information contains a start pattern, which indicates the start of the symbol information, and a stop pattern, which indicates the end of the symbol information; and the symbol information readout method further comprises a detection process in which the start pattern or the stop pattern is detected by computing the degree of similarity between a prescribed base pattern and run length data rows of bars and spaces for one column in the line direction on the corrected image data.

According to an embodiment of the present invention, the symbol information contains a start pattern, which indicates the start of the symbol information, and a stop pattern, which indicates the end of the symbol information; and the symbol information readout method further comprises a detection process in which the start pattern or the stop pattern is detected by computing the degree of similarity between a prescribed base pattern and run length data rows of bars and spaces for one column in the line direction on the corrected image data. As a result, noise caused by a quantized error or localized contamination and the like can be suppressed before the start pattern or the stop pattern is detected. Thus, a decline in decoding reliability can be prevented.

Furthermore, the symbol information readout method as described in claim 1 may utilize the fact that the symbol information readout method further may comprise a judging process in which whether or not the total number of bars and spaces for one column is equal to the number set in advance in the line direction on the corrected image data is judged.

According to an embodiment of the present invention, the above method for reading symbol information may include the judging process in which whether or not the total number of bars and spaces for one column is equal to the number set in advance in the line direction on the corrected image data is judged. Accordingly, noise caused by a quantized error or localized contamination and the like can be suppressed before judging whether or nor there is an abnormality in the data column representing the desired data. Eventually, a decline in decoding reliability can be prevented.

A symbol information readout device comprising the fact that it is equipped with a readout means in which the symbol information readout method as described in claim 1 may be used to read out symbol information.

According to an embodiment of the present invention, the symbol information readout device is equipped with a readout means in which the symbol information readout method is used to read out symbol information. Therefore, noise caused by a quantized error or localized contamination and the like can be suppressed. In addition, a decline in decoding reliability can be prevented.

The symbol information readout device as described in claim 5 comprising the fact that it is equipped with the tightly adhered [sic, stack-] type of one dimensional imaging element.

A method for reading out symbol information in which symbol information is read by processing the image data obtained by imaging the symbol information recorded on a medium may utilize a column specifying process in which breaking points of a column of the symbol information are specified by computing the total sum in the row direction on the image data obtained by imaging; and a boundary determination process in which, based on a comparison of breaking points of a column specified by the column specifying process with the end of the measured column, the boundary of each row column is determined.

According to an embodiment of the present invention, the method comprises a column specifying process in which breaking points of a column of the symbol information are specified by computing the total sum in the row direction on the image data obtained by imaging. Accordingly, the special pattern which appears on the column boundary can be enhanced. Finally, the accuracy of column structure analysis can be improved.

Furthermore, the method also comprises a boundary determination process in which, based on a comparison of breaking points of a column specified by the column specifying process with the end of the measured column, the boundary of each row column is determined accurately. As a result, an adverse effect on the subsequent and later processes can be eliminated. Eventually, accuracy of reading out bar codes can be enhanced.

A symbol information readout device comprising the fact that it is equipped with a means in which the symbol information readout method as described in claim 7 is used to read out symbol information.

The symbol information readout device as described in claim 8 comprising the fact that it is equipped with the tightly adhered [sic, stack-] type of one dimensional imaging element which images the symbol information.

According to an embodiment of the present invention, a column can be broken out correctly in the above-mentioned symbol information readout device in which the column boundary based on the one dimensional information is used as a base. Accordingly, the adverse effect on the subsequent and later row processes can be eliminated. Eventually, accuracy of reading out bar codes can be enhanced.

The symbol information readout method and symbol information readout device associated with the present invention may specify breakpoints of the symbol information column after smoothing the corrected image data having zero angle of inclination. As a result, noise caused by a quantized error or localized contaminations or the like can be suppressed. Eventually, it can prevent a decline in decoding reliability. Furthermore, the effect from projection equalization operation can suppress the influence of noise caused by localized contaminations or the like.

Furthermore, the symbol information readout method and symbol information readout device associated with this invention comprise a column specifying process in which breaking points of a column of the symbol information are specified by computing the total sum in the row direction on the image data obtained by imaging; and a boundary determination process in which, based on a comparison of breaking points of a column specified by the column specifying process with the end of the measured column, the boundary of each row column is determined. As a result, an accurate readout can be achieved without varying the bar width even if the scanning rate varies.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF REFERENCE SYMBOLS

| | |
|---|---|
| 1 | Symbol Information readout Device |
| 2 | Record Carrier |
| 11 | Imaging element |
| 11a | Imaging element |

-continued

| 12  | Image memory                 |
|-----|------------------------------|
| 13  | Data Processor               |
| 13a | Position detection element   |
| 13b | Inclination correction part  |
| 13c | Structure analysis part      |
| 13d | Decoding part                |

DETAILED DESCRIPTION OF THE INVENTION

The best mode for carrying out the present invention is described herein, referring to the drawings.

Figure 1:
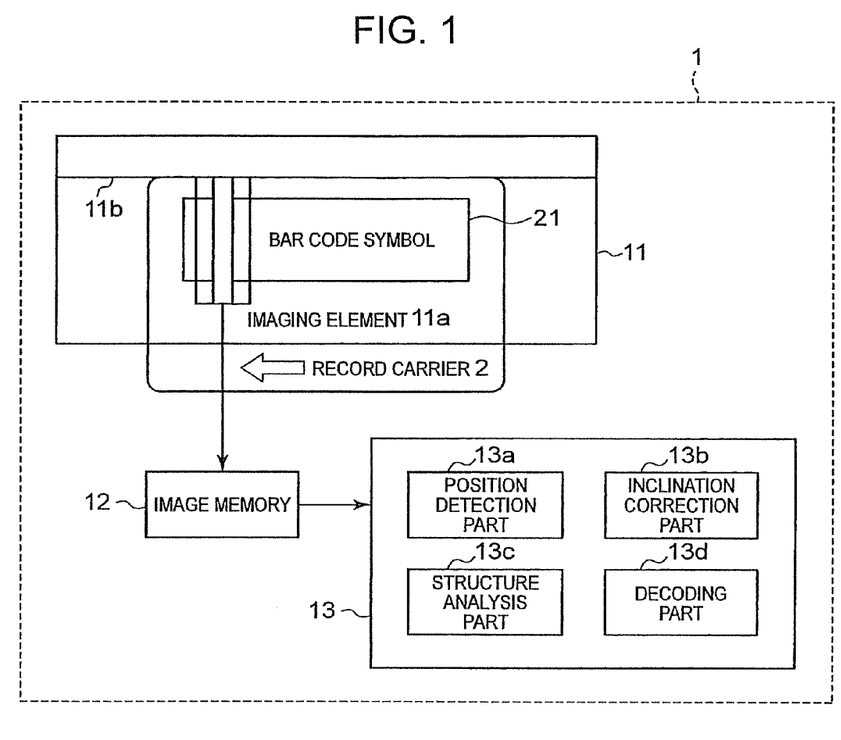
FIG. 1 is a block diagram showing the electric configuration of the symbol information readout device associated with the embodiment of the present invention.

FIG. 1 is a block diagram showing the electric configuration of the symbol information readout device 1 concerning the embodiment of the present invention.

In FIG. 1, symbol information readout device 1 comprises imaging element 11, which is constructed with stack-type imaging element 11a and card transfer mechanism 11b; image memory 12; and data processor 13. Moreover, data processor 13 is equipped with position detection part 13a, inclination correction part 13b, structure analysis part 13c, and decoding part 13d. Furthermore, bar code symbol 21 is printed on record carriers 2 such as a card to which the symbol information including a bar code and the like is given in the form of two-dimensional bar code. In addition, in the mode of this embodiment, imaging element 11a is a stack-type one-dimensional imaging element.

Imaging element 11a of image capture device 11 picks up the image of bar code symbol 21 printed on record carrier 2 through photoelectric conversion. Image memory 12 memorizes the image data of bar code symbol 21 captured by imaging element 11a. Data processor 13 acquires the image data of bar code symbol 21 from image memory 12, and may provide various processes to the acquired image data.

The symbol information readout method which is used in symbol information readout device 1 having the electric configuration associated with the embodiment of the present invention is described.

[Symbol Information Readout Method]

Figure 2:
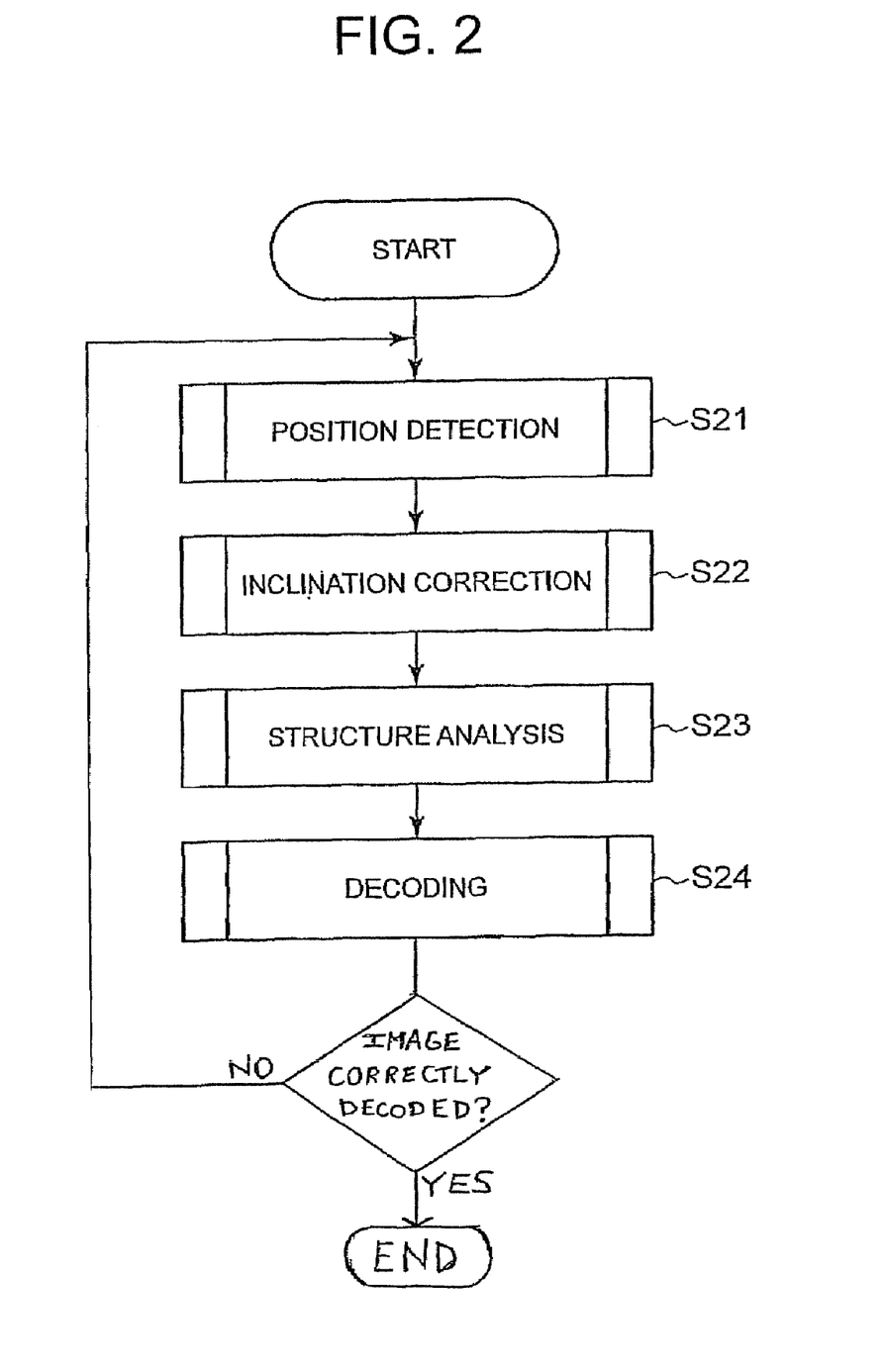
FIG. 2 is a flow chart which shows the flow of the symbol information readout method associated with the embodiment of the present invention.

FIG. 2 is a flow chart which shows the flow of the symbol information readout method concerning the embodiment of the present invention. The flow of the symbol information readout method concerning the embodiment of the present invention is outlined referring to FIG. 2.

First, position detection is carried out (Step S21). More specifically, imaging element 11a in symbol information readout device 1 using photoelectric conversion to capture the image of bar code symbol 21 on record carrier 2, which is moved to a prescribed position along card transfer mechanism 11b. And the image data of the captured bar code symbol 21 is memorized in image memory 12. In addition, this image memory 12 may be any memory including RAM, SDRAM, DDRSDRAM, and RDRAM as long as it can memorize image data.

Then, position detection element 13a of data processor 13 reads the image data memorized by image memory 12, and detects the position of bar code symbol 21 in the image data.

Subsequently, data processor 13 performs inclination correction (Step S22). More specifically, inclination correction part 13b of data processor 13 reads the image data whose position is detected in Step S21, and converts the image data into the corrected image data with the tile angle of zero.

Afterwards, data processor 13 carries out structure analysis (Step S23). More specifically, structure analysis part 13c of the data processor 13 analyzes the structure of bar code symbol 21 based on the corrected image data converted in Step S22.

Finally, decoding part 13d in data processor 13 performs decoding process (Step S24). More specifically, decoding part 13d of data processor 13 decodes bar code symbol 21 based on the structure of bar code symbol 21 analyzed in Step S23. In addition, if decoding goes wrong, the process returns to Step S21 again.

Figure 3:
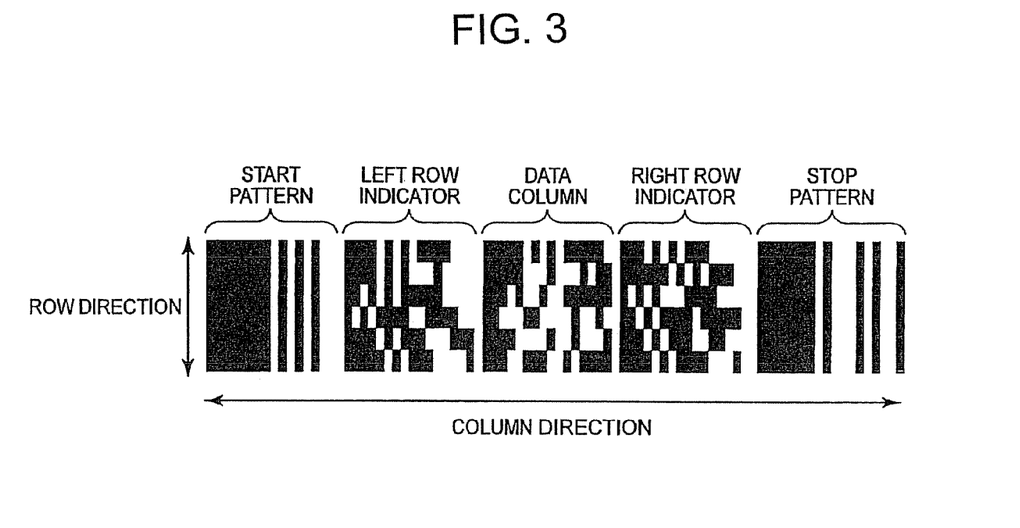
FIG. 3 is a figure showing an example of the image data of the bar code symbol captured in the method shown in FIG. 2.

FIG. 3 is a figure showing an example of the image data of bar code symbol 21 captured in Step S21 mentioned above. Bar code symbol 21 shown in FIG. 3 expresses the bar code symbol of the PDF417 label structure, which is a kind of stack-type bar code.

In FIG. 3, bar code symbol 21 is roughly divided into five sections (divided into five columns in FIG. 3) in the column direction wherein the vertical direction of the figure is referred to as the row direction and the transverse direction is referred to as the column direction. And a data column is arranged in the center; to the left and right of the data column, a left row indicator and a right row indicator are arranged respectively; and to the left and right of them [sic, the left row and the right row indicators], the start pattern and the stop pattern are arranged respectively. On the other hand, bar code symbol 21 shown in FIG. 3 is constructed with six lines, and each line contains one data word at a time. Therefore, bar code symbol 21 has six pieces of data: 1 piece (per data column)×6 lines=6.

Figure 4:
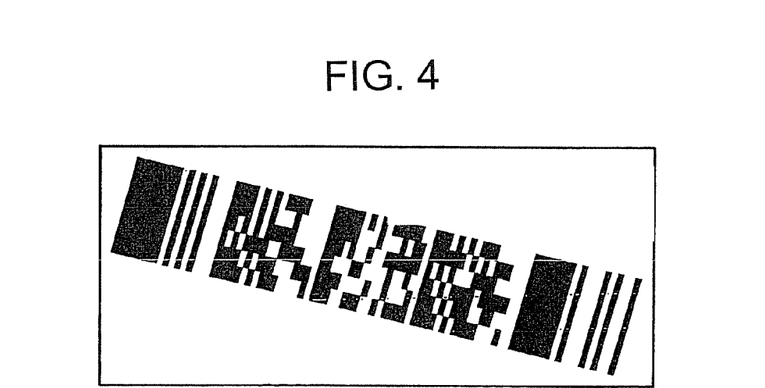
FIG. 4 is a figure showing bar code symbol which is inclined before its image is captured by the imaging element of the image capture device.

FIG. 4 is a figure showing bar code symbol 21 which is inclined before its image is captured by imaging element 11a of image capture device 11. When a bar code symbol 21 is scanned with the imaging element 11, the row direction is not necessarily perpendicular to card transfer mechanism 11b. The image data read by imaging element 11a is occasionally inclined, as shown in FIG. 4 as an example. If this happens, noise resulting from a quantized error diminishes the decoding reliability in symbol information readout device 1 of conventional technology. However, according to an embodiment of the present invention, noise can be made to affect the decoding less. Hereafter, each of the processes (Step S21-Step S24) in the flow chart of FIG. 2 is described in full detail.

Figure 5:
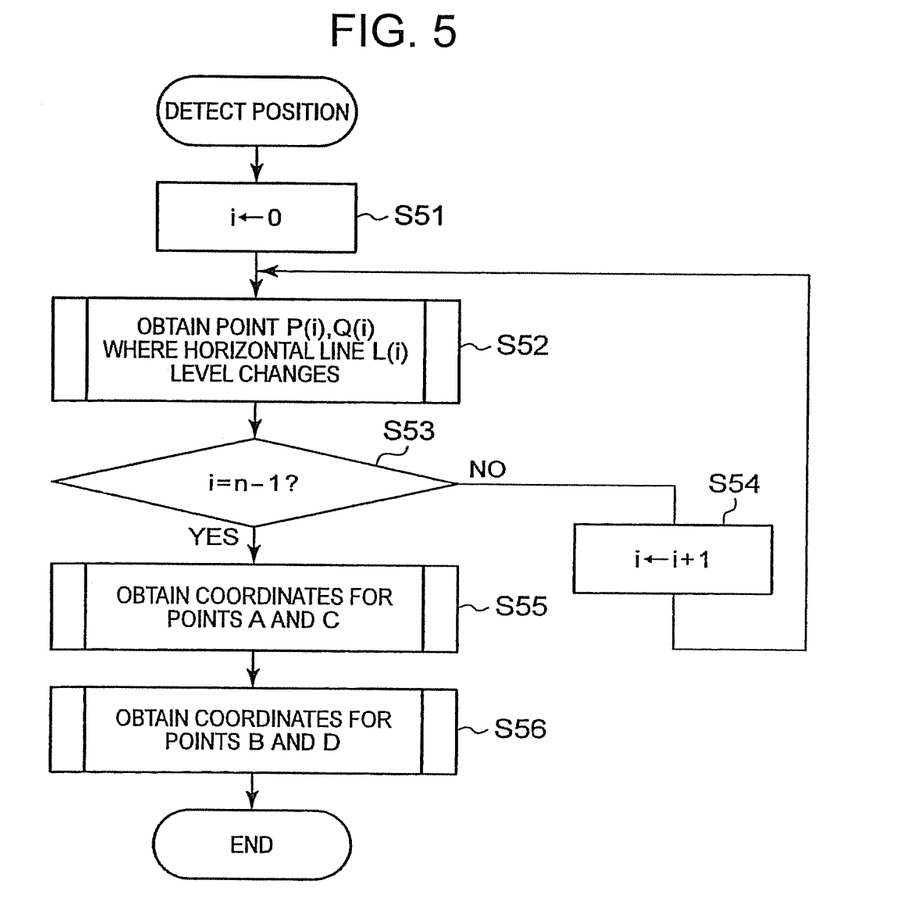
FIG. 5 is a flow chart illustrating the position detection shown in the flow chart of FIG. 2.
Figure 6:
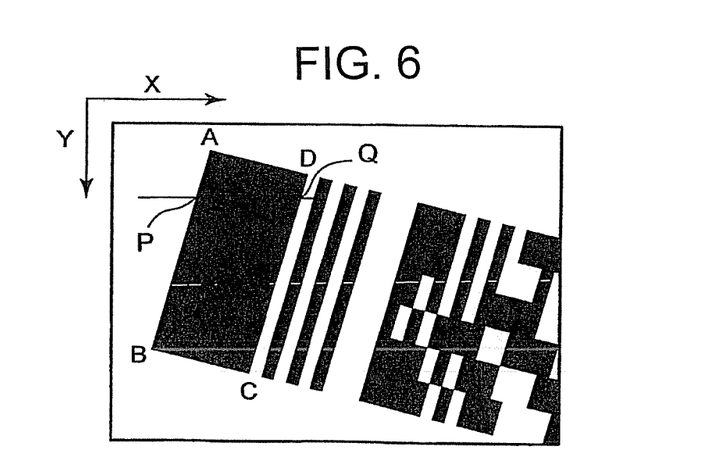
FIG. 6 is a magnified view of the big bar portion of the start pattern and its peripherals in bar code symbol 21.

FIG. 5 is a flow chart illustrating the position detection shown in the flow chart of FIG. 2. And FIG. 6 is a magnified view of the big bar portion with its surroundings of the start pattern in bar code symbol 21.

In FIG. 5, first, 0 is substituted to a variable i for initialization (Step S51).

Subsequently, on horizontal line L(i) at Y=i, the image data is read in the X-direction, and point (P(i)) where the image changes from light to dark is searched. Moreover, on the same line, point (point Q(i)) where the image changes from dark to light is searched at this time (Step S52).

Next, whether i=n−1 (n: the number of picture elements along the Y in FIG. 6) is satisfied or not is judged (Step S53); if it is judged that the condition is not satisfied, i is incremented only by 1 (Step S54); and the process of Step S52 is performed again. On the contrary, if it is judged that the condition is satisfied, the process goes to the subsequent step S55. In addition, a group of n points (P(i), Q(i)) (i=0, 1, . . . , n−2, n−1) is obtained at this stage.

Then, coordinates of point A and point C in FIG. 6 are obtained (Step S55). More specifically, $D(i)=|P(i)-Q(i)|$ is calculated, and min (D(i)), the minimum value of D(i), is obtained. This min (D(i)) corresponds to the two points of the big bar, point A and point C, with which the distance between points PQ becomes shortest (See FIG. 6). By doing so, the Y coordinates of point A and point C become Ay=min(i) and Cy=max(i), respectively. Moreover, the X coordinates of point A and point C becomes the X coordinate of points P with respect to each i [sic, max (i) and min (i)]; this means that they become the X coordinate of Ax=P (i=Ay) and the X coordinate of Cx=P (i=Cy) respectively.

Furthermore, coordinates of point B and Point C in FIG. 6 are obtained (Step S56). More specifically, the i range, which makes D(i) constant is specified. And the Y coordinates of point B and point D of the big bar becomes max (i) and min (i) in the range respectively. Moreover, the X coordinates of point B and point D become the X coordinates of point P and point Q with respect to each i [sic, max (i) and min (i)]; this means that they become the X coordinate of Bx=P (i=By) and the X coordinate of Dx=Q (i=Dy) respectively.

Thus, coordinates of the four corners of the big bar are determined through the processes of Step S51-Step S56. Now an angle of inclination can be calculated by using the following formula: atan ((Ay−Dy)/(Ax−Dx)).

Furthermore, in order to increase the inclination detection accuracy in FIG. 6, the role of X and Y may be switched to carry out the same operation so as to obtain the coordinates A', B', C', and D', the four corners of the big bar. An average of these and the original coordinate values, A, B, C, and D, may be adopted as the final coordinate values.

Moreover, in FIG. 5, coordinates of point A and point C are obtained (Step S55) as well as coordinates of point B and point D (Step S56). However, the present invention is not limited to this. For example, only the coordinates of point A and point C only may be calculated to detect the angle of inclination.

[Inclination Correction]

Figure 7:
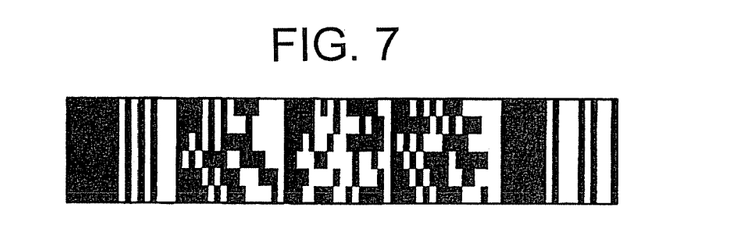
FIG. 7 is a figure illustrating the condition in which the image data of bar code symbol inclined by a prescribed angle is converted to the corrected image data having zero angle of inclination.

FIG. 7 is a figure illustrating the manner in which the image data of bar code symbol 21 having the previously described angle of (=atan ((Ay−Dy)/(Ax−Dx))) is converted to the corrected image data having zero angle of inclination.

In FIG. 7, the conversion to the corrected image data having zero angle of inclination uses the angle of inclination of bar code symbol 21. For example, the affine transformation method and the like can be used. And the symbol information readout method of the embodiment of the present invention suppresses the influence of a quantized error resulting from the coordinate conversion, and performs interpolation process or equalizing process to smooth the post-coordinate conversion image. For example, this process is performed by filtering the corrected image data with any type of filter such as median filter, an edge preserving filter, an adaptation Winner filter, and a smoothing filter.

[Structure Analysis]

Figure 8:
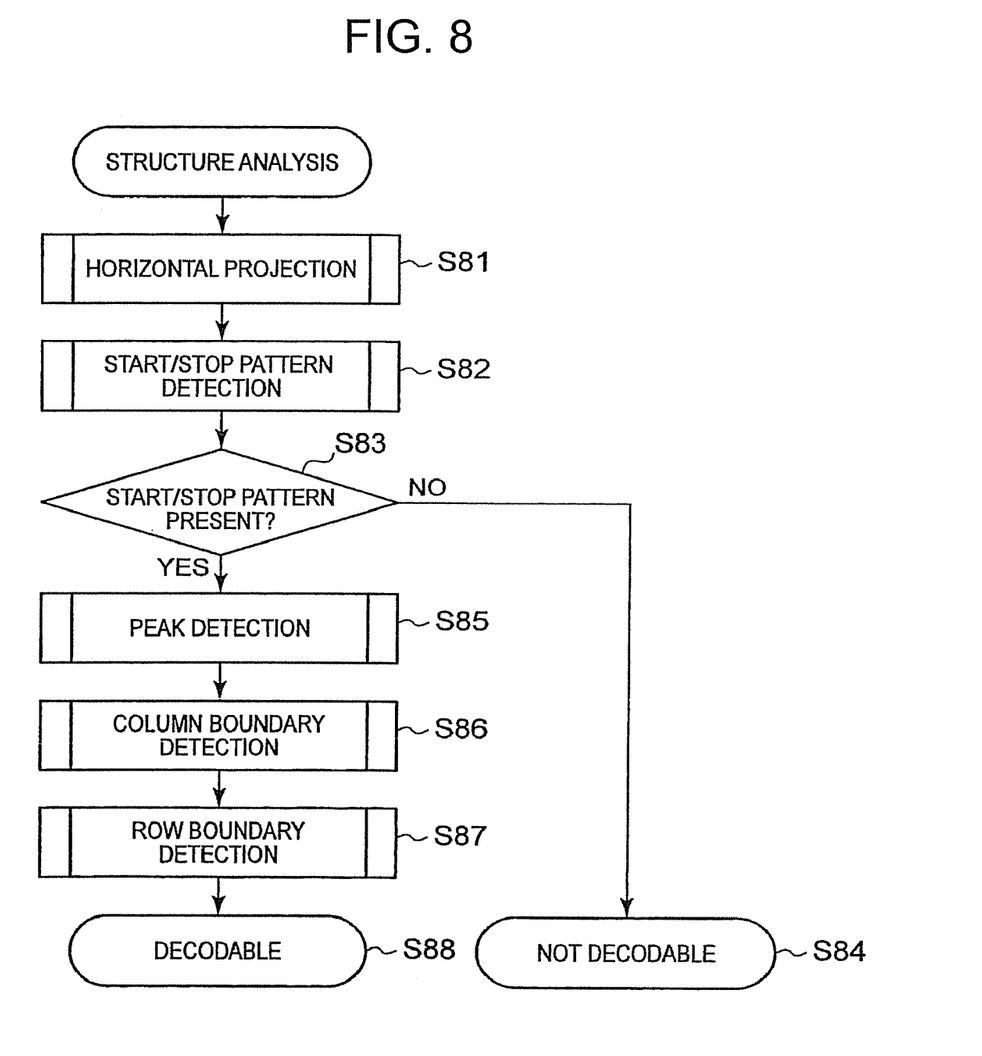
FIG. 8 is a flow chart illustrating the flow of the structure analysis shown in the flow chart of FIG. 2.

FIG. 8 is a flow chart illustrating the flow of the structure analysis shown in the flow chart of FIG. 2.

In FIG. 8, first, horizontal projection process is performed (Step S81), followed by the analysis of the start pattern and the stop pattern using the projection difference (Step S82). Unlike other code words, the start pattern and the stop pattern are common and constant to all rows; as a result, adoption of projection enables the pattern to be equalized and stabilized before detection. Furthermore, the start pattern analysis is described as an example hereinafter. However, the stop pattern analysis is not described because it can be performed in the same manner.

Figure 9A:
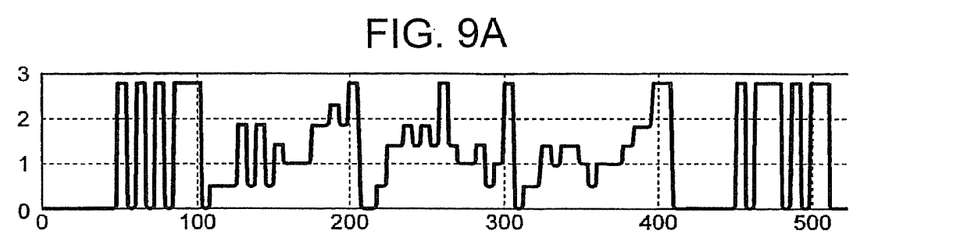
FIG. 9A and FIG. 9B are figures obtained by performing a prescribed process to the equalized corrected image data (See FIG. 7).
Figure 9B:
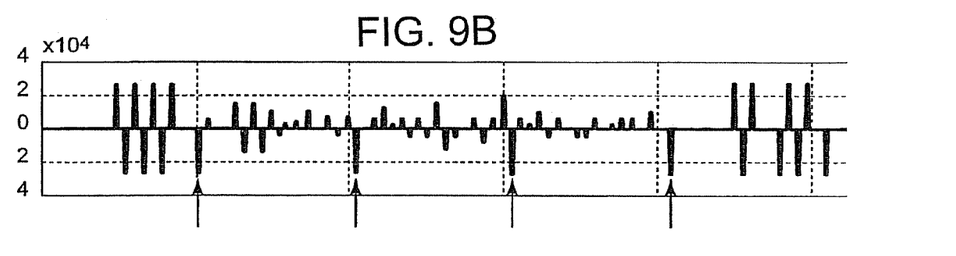

FIG. 9 is a figure obtained by performing a prescribed process to the equalized corrected image data (See FIG. 7).

FIG. 9A shows the projection in the horizontal direction computed for the equalized corrected image data (See FIG. 7). FIG. 9A is formed by summing the corrected image data of FIG. 7 in the row direction. In FIG. 7, the row direction is the vertical direction (i.e., the same direction as the row direction in FIG. 3). Furthermore, FIG. 9B is a graph showing differences for the graph of FIG. 9A.

The start pattern is detected using the graphs shown in FIG. 9A and FIG. 9B by counting the run length of the point where the pattern changes in terms of the number of picture elements. For example, in FIG. 9B, a run length[1] of the point where the pattern changes can be obtained as follows: StartWork=[47, 6, 5, 6, 7, 6, 6, 18]. On the other hand, the ratio of the start pattern bar to the space in length is StartMark=[8, 1, 1, 1, 1, 1, 1, 3] under the PDF417 rule. Here, the normalized correlation R, for example, can be used as an index for investigating the degree of similarity between the two. Normalized correlation R for FIG. 9B is calculated as R=corrcoef (StartWork, StartMark)=0.9993; R is close enough to 1. Therefore, this case should be judged that the start pattern is detected relevantly.

After whether the start/stop pattern is detected relevantly or not is judged (Step S83) as previously described, and if it is judged that the start/stop pattern is detected relevantly, the process moves to Step S85. On the contrary, if it is judged that start/stop pattern is not detected relevantly, it is deemed that decoding cannot be provided, when the process is terminated (Step S84).

In addition, in this embodiment, the normalized correlation R is used as a measure of the degree of similarity. However, the present invention is not restricted to this. For example, a sum of absolute differences, a product-sum, and the like may also be used if the situation requires.

Next, peaks are detected for the graph in FIG. 9B (Step S85). More specifically, the space-to-bar transition occurs in all rows at the code word boundary. As a result, a large difference appears in this portion on the projection difference waveform (See the arrows pointing upward in FIG. 9B). And in order to calculate differences (peak values) designated by the arrows pointing upward in FIG. 9B, a suitable threshold value is prepared so as to judge the presence or absence of peaks by checking whether the peak values exceed the threshold value or not. In addition, positions of these peaks should be memorized because they are used in the next process.

Then, a column boundary detection is carried out (Step S86). More specifically, based on the peak positions memorized in Step S85, the column boundary is detected. Moreover, the adjoining peak-to-peak run length expresses the column width, which is memorized similarly. When an area near the boundary of a specific row is contaminated, the changing point of code word may not always be detected correctly as rows are scanned. However, the use of projection like this embodiment suppresses the influence of this contamination with the equalization effect. The adverse effect on detection of the code word boundary is thus suppressed.

Figure 10A:
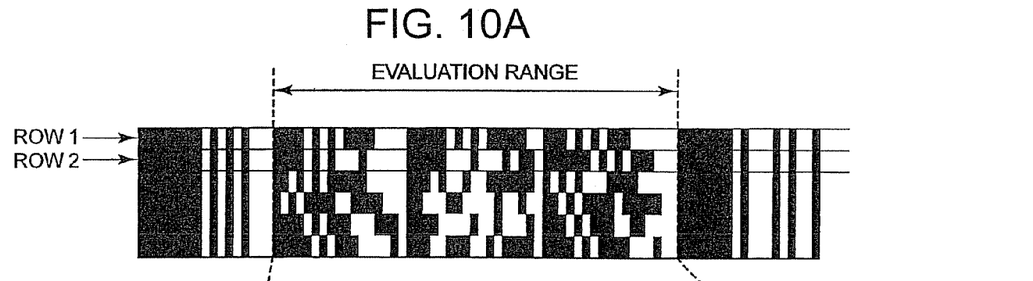
FIG. 10A and FIG. 10B are waveform charts showing the picture element value of each line in the horizontal direction for the equalized corrected image data.
Figure 10B:
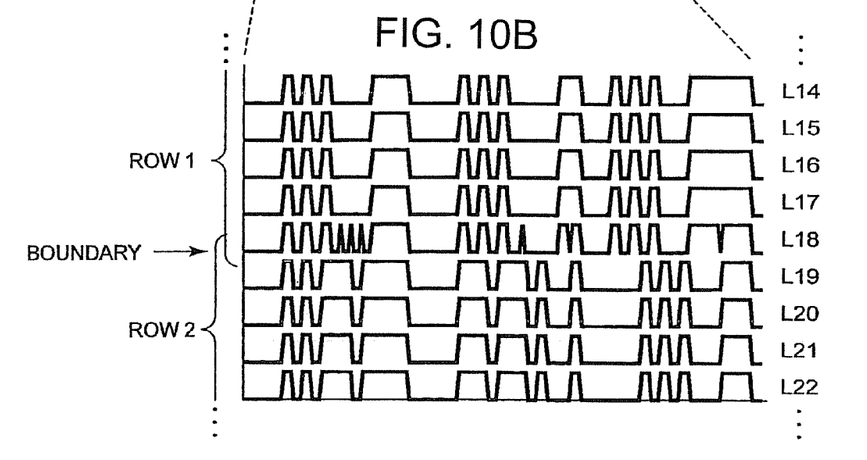
Figure 11:
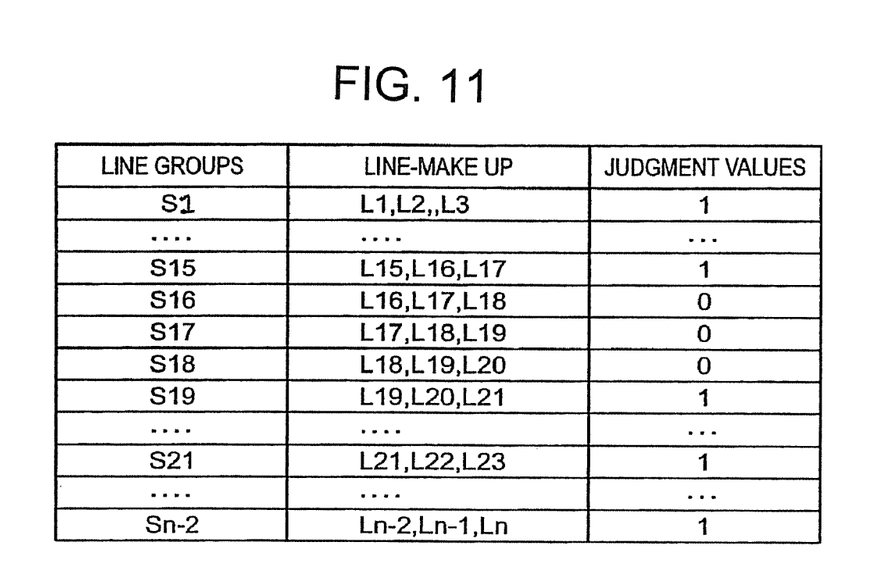
FIG. 11 is a diagram describing the mode of specifying the line break of bar code symbol is specified.

Subsequently, a row boundary detection is performed (Step S87). More specifics are described by referring to FIG. 10A, FIG. 10B, and FIG. 11. FIG. 10A and FIG. 10B are waveform charts showing the picture element value for each line in the horizontal direction on the equalized corrected image data. FIG. 11 is a diagram describing a mode in which the line breakpoints of bar code symbol 21 are specified.

In FIG. 1A, the row boundary detection begins with setting a group of continuous two or more lines on the equalized corrected image data. For example, a group (line group S1) with continuous three horizontal lines L (1), L (2) and L (3), and (referred to as "L1, L2, and L3" hereinafter) is assigned.

And calculation of normalized self-correlation and normalized mutual correlation among them provides a total of 9 correlation values (correlation value rows made up with 9 correlation values: (3) values from normalized self-correlation of L1 and L1, L2 and L2, L3 and L3); and (6) values from normalized mutual correlation calculation of L1 and L2, L1 and L3, and L2 and L1, L2 and L3, L3 and L1, as well as L3 and L2). If the minimum value of the 9 correlation values is greater than threshold value r0 determined beforehand, 1 is assign to this line group S1; if it is less than threshold value r0 determined beforehand, 0 is assigned to line group S1.

Here, in the group made up with horizontal lines, namely L1, L2, and L3, all horizontal lines L1, L2, and L3 are included in row 1 (uppermost row). Thus, the minimum value of the 9 correlation values becomes greater than threshold value r0, and 1 is assigned to the group (In FIG. 11, the judgment value 1 is assigned to the line group S1).

Next, the group mentioned above is shifted with respect to the corrected image data (for example, assuming line group S2 is made up with L2, L3, and L4) to compute a correlation value rows, and whether the minimum value of the computed correlation value rows is greater than the threshold value or not is judged. The judgment value of 0 or 1 is thus assigned to the line group.

By repeating the processes (for assigning a judgment value) mentioned above up to horizontal line Ln−2, Ln−1, and Ln (line group Sn−2) in the same manner, a total of (n−2), which is the series made up with 0 and 1 is obtained (right column in FIG. 11).

Here, if three horizontal lines are selected from the same row, the line group made up with these three horizontal lines obtains a value close to 1; if the three horizontal lines are selected across rows, the line group made up with these three horizontal lines obtains a relatively small value. More specifically, in FIG. 10B, horizontal lines above horizontal line L18 belong to row 1; those below horizontal line L18 belong to row 2; this horizontal line L18 is the horizontal line located on the boundary between row 1 and row 2.

Therefore, a line group which includes this horizontal line L18 obtains the judgment value of 0; the other group obtains the judgment value of 1 (See FIG. 11). The line group with the judgment value close to 0 represents row switching. Scanning a series of judgment values and specifying the location where the judgment value is close to 0 pinpoint the row switching point. In addition, in this mode of embodiment, the correlation function evaluates similarities among horizontal lines, so the use of the range excluding the common patterns, namely the start pattern and the stop pattern, as the evaluation range as illustrated in FIG. 10A enables elimination of unnecessary operation (calculation cost).

As described above, row boundaries of Step S87 are detected by the following flow: set up a line group→compute correlation value rows→compare the minimum values of the correlation value rows with a threshold value→assign judgment values, namely 0 or 1→scan a series of judgment values.

Furthermore, if it is judged to which row each horizontal line on the corrected image data belongs through the row boundary detection, the process ends deeming that decoding can be performed (Step S88). Moreover, localized noise on horizontal lines can be reduced by calculating an average of the horizontal lines contained in a row for every row.

Furthermore, the post equalization horizontal lines can be used for the decoding process described later as a picture element pattern of the row. Thus, decoding accuracy can be enhanced.

Figure 12:
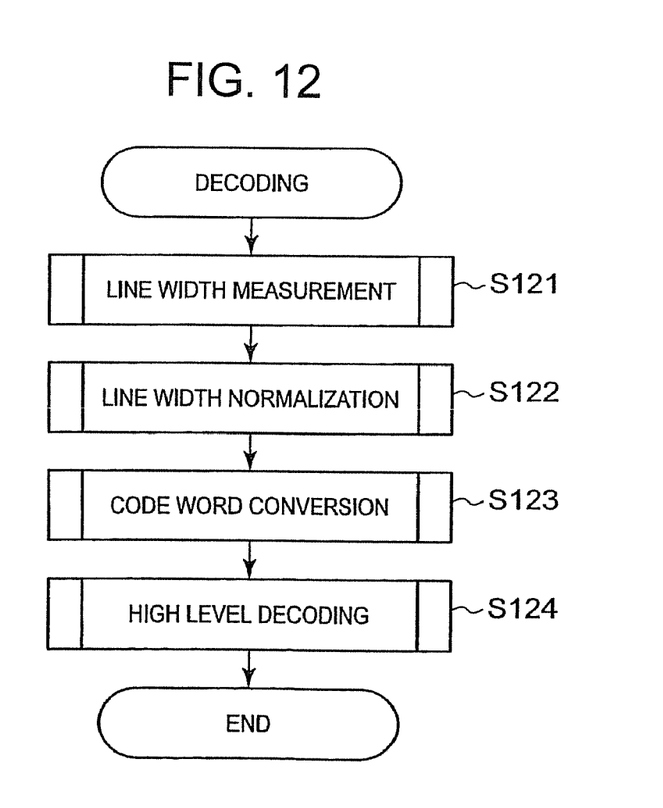
FIG. 12 is a flow chart which shows the flow of decoding illustrated in the flow chart of FIG. 2.

FIG. 12 is a flow chart which shows the flow of decoding illustrated in the flow chart of FIG. 2.

FIG. 12 begins with the line width measurement is taken first (Step S121). More specifically, the line width measurement is the process in which a picture element pattern of each row is scanned, and the bar-to-space length, which is a line width, is computed. This line width measurement is described in detail with reference to FIG. 13A and FIG. 13B.

Figure 13A:
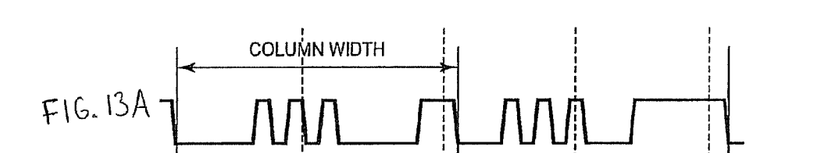
FIG. 13A and FIG. 13B are waveform charts showing a partial picture element patterns in rows.
Figure 13B:
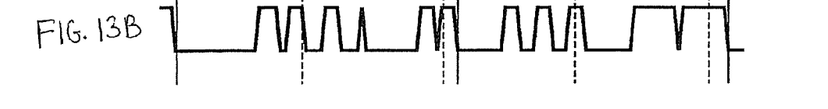

FIG. 13A and FIG. 13B are waveform charts showing a row partial picture element pattern. In addition, the bar width and the space width count the number of picture elements between the changing points of the pattern. One column is made up with four bars and four spaces; as a result, if there is no damage in the picture element pattern, as shown in FIG. 13A, a total of eight width data is obtained.

On the other hand, if abnormalities exist in the picture element pattern, as shown in FIG. 13B, a total of eight or more (nine pieces of) width data is obtained. In this case, it is found that a column is damaged, and the flag is assigned to warn the poor reliability of this column.

Figure 14:
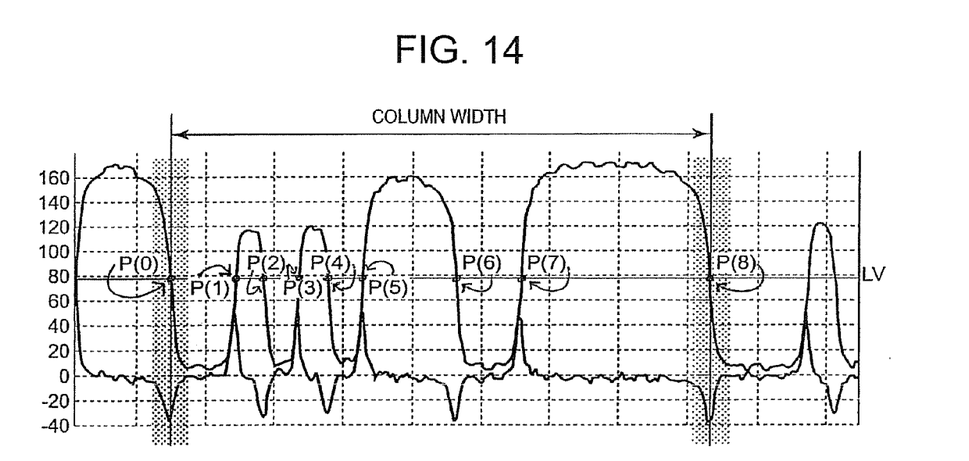
FIG. 14 shows a part of the measurement data required for obtaining picture element patterns of a row.
Figure 15:
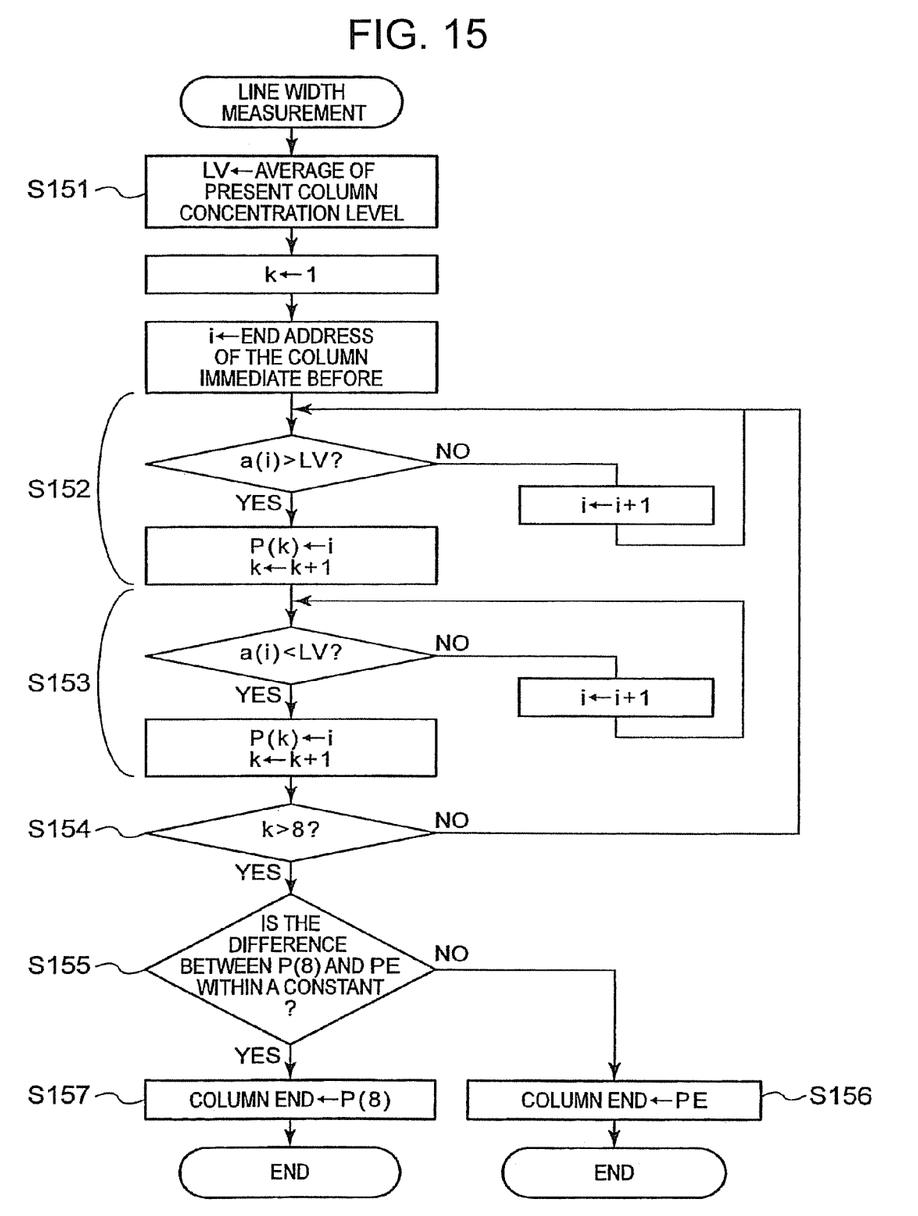
FIG. 15 is a flow chart illustrating the flow of the line width measurement shown in the flow chart of FIG. 12.

Here, the measurement for finding the bar-space length required for obtaining a picture element pattern of a row is described. FIG. 14 shows a part of the measurement data required for obtaining a picture element pattern of a row. FIG. 15 is a flow chart illustrating the flow of the line width measurement shown in the flow chart of FIG. 12.

In FIG. 14, the boundary between a bar and a space is expressed by the pattern's one changing point and the other changing point. Therefore, a line width and a space width can be obtained by counting the number of picture elements between the pattern's one changing point and the other changing point.

First, an average LV of level values of the pattern in the target column (P(0)-P (8)) in FIG. 14 is calculated (S151). And point P (1) where the level value exceeds LV is calculated using P (0) as its starting point (S152). The interval between P (1) and P (0) represents the width of the first black bar of this column. Next, point P (2) where the level value is less than LV is calculated (S153). P(2)-P (1) represents the first space width in this column.

The same operation is repeated (S152-S153) until end point P (8) is detected (S154), and end point P (8) in the target column (P(0)-P (8)) is calculated.

Next, an end point P (8) obtained by measurement is compared with another end point PE obtained as a result of the above-mentioned structure analysis (S155). If the gap between the two exceeds the prescribed range, priority is given to the result of structure analysis, and end point PE is adopted as the column boundary (S156). On the contrary, if the gap of end point P (8) and end point PE is within the prescribed range, end point P (8) is adopted as the column boundary (S157). In addition, the end point of a column and a column boundary mean the same here.

As described above, the end point is adjusted so as to reflect the result of the structure analysis on the line width measurement. As a result, even if noise increases the number of bars and spaces as illustrated in FIG. 13B, an adverse effect to the subsequent process can be eliminated without causing misjudgment on the column boundary. That is, if a column is damaged, the damaged column is corrected or the damaged column is flagged to indicate that the column is unreliable, thereby invalidating the column. Alternatively, the end point can be corrected to become PE to advance the process to the next step. Hence, the subsequent process remains unaffected.

Once the above operation is executed up to the end of the picture element pattern, the same process is executed for the next row. If line width data is obtained for all rows, the process in Step S121 (refer to FIG. 12) is terminated.

Subsequently, line width normalization process is performed (Step 122). The line width normalization process is the process in which the line width data expressed by the number of picture elements is converted to a module number representation. One module corresponds to the minimum width of a bar or a space. One column is made up of 17 modules. Where the line width data per column is W1, W2, W3, W4, W5, W6, W7, and W8, while Wc=W1+W2+W3+W4+W5+W6+W7+W8, then normalization line width data is the X sequence expressed by Xi=Wi*17/Wc (i=1, 2, - - -, 7, 8). For example, the X sequence of the left-side column as shown in FIG. 13A is [5, 1, 1, 1, 1, 1, 5, 2].

Furthermore, the X sequence is converted to the t sequence. This is a sum of two adjoining Xi and Xi+1. The X sequence of the left-side column as shown in FIG. 13A is converted to [6, 2, 2, 2, 2, 6, 7] in the t sequence.

Subsequently, code word conversion is carried out (Step S123). More specifically, the code word corresponding to the t sequence obtained in Step S122 is acquired from a prescribed reference table. In addition, if the code word conversion is completed, general high-level decoding is performed (Step S124). The decoding process is thus completed. Moreover, the data, for which the decoding process is completed, is outputted to a higher level control device with a symbol image and the like.

As described above, according to the symbol information readout method implemented by the flow illustrated in FIG. 2, the degree of noise caused by quantized error, local contamination, and the like can be reduced by using the interpolation process and the equalization process which are provided if the situation requires. Thus, a decline in decoding reliability can be prevented.

OTHER MODES OF EMBODIMENT

Moreover, in this embodiment, the present invention is applied to the combination of a one-dimensional imaging element and a linear conveyance mechanism. However, the present invention is not limited to this. For example, the present invention may be applied to the combination of an area sensor (e.g. two-dimensional CCD, CMOS imager) and an object support mechanism.

Furthermore, in this embodiment, the PDF417 format is used for bar code labels. However, the present invention is not limited to this. For example, Code49 and other stack-type bar codes, and one-dimensional bar codes such as JAN may be applied to bar code labels as well.

INDUSTRIAL APPLICATION

The symbol information readout method and symbol information readout device associated with the present invention are useful in that they can prevent a decline in decoding reliability by reducing noises such as quantized errors, local contaminations and the like.

While the preferred embodiments of the present invention have been described using specific terms, such description is for illustrative purposes only, and it is to be understood that changes and variations may be made without departing from the spirit or scope of the appended claims.

What is claimed is:

1. A method for reading out symbol information in which symbol information is read by processing image data obtained by imaging the symbol information recorded on a medium comprising:
    performing an angle changing process in which said image data are converted to corrected image data having zero angle of inclination;
    performing a smoothing process in which said corrected image data are smoothed;
    performing a projection process in which said corrected image data smoothed by said smoothing process are totally summed up in a row direction and successively projected in a column direction; and
    performing a column specifying process in which breakpoints of a symbol information column are specified by a projected result in the column direction which is obtained by the projection process.

2. The method for reading out symbol information as described in claim 1 further comprising a row specifying process comprising:
    setting a line group which comprises adjacent multiple lines which are disposed in the row direction and each of the adjacent multiple lines is extended in the column direction on the corrected image data;
    computing correlation matrix values of the line group on a basis of the corrected image data to obtain a judgment value corresponding to the line group;
    relatively moving the line group successively in the row direction to obtain respective judgment values based on the correlation matrix values; and
    specifying breakpoints of rows of the symbol information based on the judgment values.

3. The symbol information readout method as described in claim 2 wherein said symbol information comprises a start pattern, which indicates the start of said symbol information, and a stop pattern, which indicates the end of said symbol information; and said symbol information readout method further comprises performing a detection process in which said start pattern or said stop pattern is detected by computing a degree of similarity between a prescribed reference width data and width data in the column direction of bars and spaces for one column of the corrected image data.

4. The symbol information readout method as described in claim 1 wherein said symbol information comprises a start pattern, which indicates the start of said symbol information, and a stop pattern, which indicates the end of said symbol information; and said symbol information readout method further comprises performing a detection process in which said start pattern or said stop pattern is detected by computing a degree of similarity between a prescribed reference width data and width data in the column direction of bars and spaces for one column of the corrected image data.

5. The symbol information readout method as described in claim 1 further comprising performing a judging process which judges whether or not a total number of bars and spaces of one column on the corrected image data is equal to a number set in advance to detect abnormality of the one column.

6. A symbol information readout device comprising a readout means for performing:
    an angle changing process in which said image data are converted to corrected image data having zero angle of inclination;
    a smoothing process in which said corrected image data are smoothed;

a projection process in which said corrected image data smoothed by said smoothing process are totally summed up in a row direction and successively projected in a column direction; and a column specifying process in which breakpoints of a symbol information column are specified by a projected result in the column direction which is obtained by the projection process.

7. The symbol information readout device as described in claim 6 wherein said readout means to read out said symbol information comprises a tightly adhered stack-type one dimensional imaging element.

8. A method for reading out symbol information in which symbol information is read, the method comprising:

processing image data obtained by imaging the symbol information recorded on a medium comprising:

a projection process in which corrected image data smoothed by a smoothing process are totally summed up in a row direction and successively projected in a column direction;

a column specifying process in which breaking points of a column of said symbol information are specified by a projected result in the column direction which is obtained by the projection process;

and performing a boundary determination process in which, based on a comparison of breaking points of a column specified by said column specifying process with an end of a measured column, the boundary of each row column is determined.

9. A symbol information readout device comprising a means for performing:

a projection process in which corrected image data smoothed by a smoothing process are totally summed up in a row direction and successively projected in a column direction;

a column specifying process in which breaking points of a column of said symbol information are specified by a projected result in the column direction which is obtained by the projection process;

and a boundary determination process in which, based on a comparison of breaking points of a column specified by said column specifying process with an end of a measured column, the boundary of each row column is determined.

10. The symbol information readout device as described in claim 9 further comprising a tightly adhered stack-type one dimensional imaging element which images said symbol information.

* * * * *